United States Patent Office 3,458,529
Patented July 29, 1969

3,458,529
NITROGENOUS BASES SUBSTITUTED BY AT LEAST ONE NAPHTHYL OR NAPHTHYL-METHYL RADICAL
Etienne Szarvasi and Michel Bayssat, Lyon, France, assignors to Lipha, Lyonnaise Industrielle Pharmaceutique
No Drawing. Filed June 1, 1965, Ser. No. 460,474
The portion of the term of the patent subsequent to Aug. 1, 1984, has been disclaimed
Claims priority, application France, June 10, 1964, 977,740
Int. Cl. C07d *27/04, 5/04*
U.S. Cl. 260—326.3                                6 Claims

ABSTRACT OF THE DISCLOSURE

Novel aminoesters substituted by at least one naphthylmethyl radical having the formula

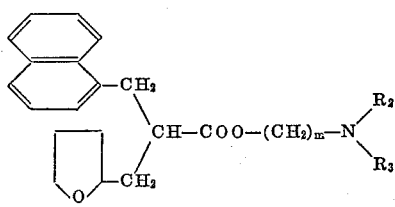

wherein $m$ is a number selected from the group consisting of 2 and 3; and $R_2$ and $R_3$ are selected from the group consisting of ethyl when $m=3$, and together with the nitrogen atom, pyrrolidino when $m=2$. The new compounds and their salts of addition have especially interesting anti-spasmodic, vaso-dilatatory, locally anaesthetic and antitussive properties.

---

The present invention relates to certain novel aminoesters substituted by at least one naphthyl or naphthylmethyl radical, and to their acid salts, especially of organic acids, and to the method for preparing the same.

Certain new nitrogenous bases substituted by at least one naphthyl or naphthyl-methyl radical have been already described in the U.S. Patent No. 3,334,096 which issued Aug. 1, 1967, in the name of the applicants.

The invention concerns new compounds not specifically described therein, and represented by the following general formula:

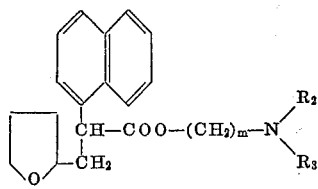

wherein:

$m$ is a member of a group consisting of numbers 2 and 3
$R_2$ is a member of a group consisting of the ethyl radical and the first group connected to the nitrogen atom for completing a heterocycle of the group formed by pyrrolidin; and
$R_3$ is a member of a group consisting of the ethyl radical and the last group of the heterocycle hereinbefore defined.

The derivatives of these compounds which also form an object of this invention are their acid salts, and preferably the salts of organic acids.

The new nitrogenous bases according to the invention are prepared by condensation of a derivative having the formula

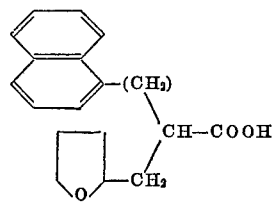

with a derivative having the formula

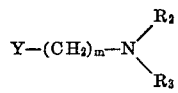

wherein:

Y is a member of the group consisting of halides and the hydroxy radical;
$m$, $R_2$ and $R_3$ are as defined hereinbefore.

Aminoesters with the formula

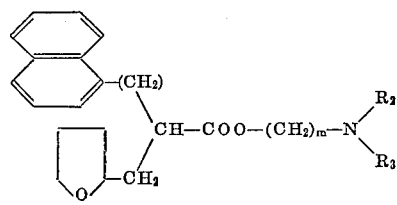

may be prepared by esterifying an acid corresponding to the desired ester with the hydroxy-amino derivative having the formula

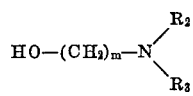

wherein $R_2$ and $R_3$ are as defined above.

According to the invention it is in addition possible to obtain the aminoesters by azeotropic esterification, consisting in heating together under reflux the acid and the hydroxy derivative in the presence of an entraining agent for the water of esterification.

The acids used as starting products in the preparation of the above-mentioned aminoesters are described in the U.S. Patent No. 3,257,420 issued June 21, 1966 in the name of the applicants.

The acid salts of the compounds according to the invention, and especially the salts of organic acids, such as the salts of oxalic and fumaric acids, are obtained by neutralizing the aminoesters, which form thus the intermediate products in the preparation of their derivatives.

The new compounds according to the invention and their salts of addition have especially interesting anti-spasmodic, vaso-dilatatory, locally anaesthetic and antitussive properties.

The anti-spasmodic action of the compounds according to the Magnus test is studied on the isolated intestine and the spasms caused by barium chloride serve to determine the papaverinic action of the product. The papaverin coefficient indicates the minimum dosage of the product relative to that of papaverin, capable of arresting or increasing the movements induced in the isolated duodenum, for example, of a rat or in the intestine of a rabbit. Under the same conditions, the activity of papaverin is 100.

The vaso-dilatatory action is determined by means of several methods, especially by means of the Langendorff apparatus which enables the coronary output of an isolated heart to be measured, e.g., that of a rabbit. The Langendorff coefficient represents the minimum dosage of the product causing the same output as $10^{-5}$ grammes of papaverin, which is given the coefficient 100.

The vaso-dilatatory action is also expressed by the femoral rotametric coefficient. This coefficient is determined as above by measuring the blood output into the femoral artery of a dog. In this case, the products are applied by intravenous injection or by intra-arterial injection. Papaverin (1 mg. for intra-arterial and 25 mg. for intravenous injection) has the coefficient 100.

The following table gives the activities of the different compounds according to the invention:

| Compound | Magnus test | Langendorff | Femoral rotametry |
|---|---|---|---|
| Acid oxalate of β-(naphthyl-1)-β'-tetrahydrofuryl isobutyrate of N-(ethyl)-pyrrolidine. | 1,000 | 87.5 | 165 |
| Acid oxalate of β-(naphthyl-1)-β'-tetrahydrofuryl isobutyrate of N-diethylaminopropyl. | 600 | 225 | 200 |

In the following, there are described, by way of example and in a non-limitative manner, the method of preparing and the physical constants of several compounds according to the invention.

EXAMPLE 1

Acid oxalate of β-(naphthyl-1) β'-tetrahydrofuryl isobutyrate of N-(ethyl) pyrrolidine $C_{26}H_{33}NO_7$    Molecular mass=471.53

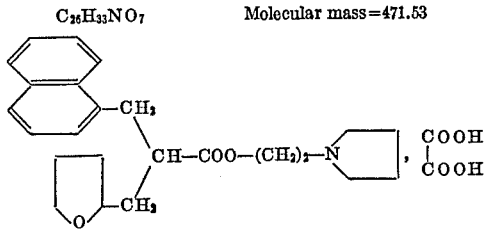

(a) Preparation of the free base.—During 8½ hours are heated under reflux 30 grammes (0.106 mol) of β-(naphthyl-1)-β'-tetrahydrofuryl isobutyric acid in 230 cc. isopropanol with 13.5 grammes (0.10 mol=13.36 g.) of N-[β-chloroethyl] pyrrolidine. After vacuum evaporation of the isopropanol, the siropy residue is treated with a $CO_3K_2$ solution. The ether is extracted after drying over $SO_4Na_2$, the distillation yields a brown oil with a boiling point at $PE_{1.36\ millibars}$=214–215° C.

This product distills under decomposition, and it is preferable to use it in its crude state such as is obtained after evaporation of the volatile constitutents.

(b) Preparation of the salt.—13 grammes (0.034 mol) of β-(naphthyl-1) β'-tetrahydrofuryl isobutyrate of crude N-(ethyl) pyrrolidine are dissolved in 26 cc. acetone. This solution is poured into a solution containing 4.3 g. (0.034 mol) bihydrated oxalic acid in 16 cc. acetone. The solution is boiled for 15 minutes. After allowing to stand overnight in a cooling chamber, the white crystals forming are recovered by drying and after drying under a vacuum, they have a melting point of 117–119° C. (heating stage). The melting point does not change after recrystallization from methyl isobutylketon.

Acidity index.—Calculated, 237. Found, 230.

Gravimetric analysis (percent).—Calculated: C, 66.22; H, 7.05; N, 297. Found: C, 66.24; H, 7.15; N, 3.06.

EXAMPLE 2

N-diethylaminopropyl β-(naphthyl-1) β'-tetrahydrofuryl isobutyrate $C_{25}H_{35}NO_3$    M=397.53

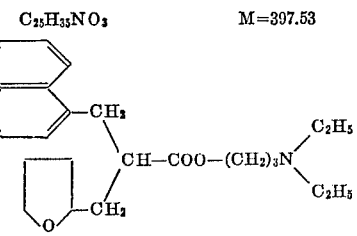

(a) Preparation of the free base.—Following the conditions of Example 1(a) 30 g. (0.106 mol) of β-(naphthyl-1)-β'-tetrahydrofuryl isobutyric acid, in 230 cc. isopropanol were treated with 15 g. (0.10 mol) of N-[γ-chloropropyl]diethylamine.

The distillation yields 31 grammes of a yellow oil of aminated odour, B.P. $_{0.884-0.952\ mb.}$=175–177° C. The yield is 74% (theoretical quantity=42 grammes).

The redistilled product is analytically pure and has the following constants:

B.P. $_{0.884\ mb.}$=178° C.

$n_d^{21}$=1.5577

Gravimetric analysis (percent).—Calculated: C, 75.53; H, 8.87; N, 3.52. Found: C, 76.75; H, 8.79; N, 3.28.

(b) Preparation of the acid oxalate of N-diethylaminopropyl β-(naphthyl-1)-β'-tetrahydrofuryl isobutyrate.— $C_{27}H_{37}NO_7$; M=487.57. Following the conditions of Example 1(b) 7.95 grammes (0.02 mol) of N-diethylaminopropyl β-(naphthyl-1)-β'-tetrahydrofuryl isobutyrate in solution in 8 cc. acetone, were treated with 2.52 g. (0.02 mol) bihydrated oxalic acid in 16 cc. acetone. The oil forming in the cooling chamber is separated and taken up in ethyl acetate. After one night's cooling, the formed hygroscopic crystals are dried.

Recrystallization of the crude salt in a mixture of ethyl acetate-ethanol yields white crystals, M.P.=42–44° C. (capillary tube), which are highly hygroscopic.

Acidity index.—Calculated: 229. Found: 222.

Gravimetric analysis (percent).—Calculated: C, 66.51; H, 7.65; N, 2.87. Found: C, 65.51; H, 7.74; N, 2.91.

What we claim is:

1. A compound of the formula

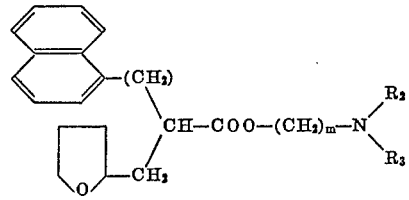

wherein m is a member selected from the group consisting of 2 and 3; and $R_2$ and $R_3$ are selected from the group consisting of ethyl when m=3 and together with the nitrogen atom, pyrrolidino when m=2.

2. An acid addition salt of a compound according to the formula of claim 1.

3. The N-(ethyl)-pyrrolidino ester of β-(naphthyl-1) β'-tetrahydrofuryl isobutyric acid, in accordance with claim 1.

4. The acid oxalate of N-(ethyl)-pyrrolidino ester of β-(naphthyl-1) β'-tetrahydrofuryl isobutyric acid, in accordance with claim 2.

5. The N-diethyl aminopropyl ester of β-(naphthyl-1) β'-tetrahydrofuryl isobutyric acid, in accordance with claim 1.

6. The acid oxalate of N-diethyl aminopropyl ester of β-(naphthyl-1) β'-tetrahydrofuryl isobutyric acid, in accordance with claim 2.

References Cited

UNITED STATES PATENTS 2,489,950 11/1949 Blicke.
3,144,464 8/1964 Wollweber et al.
3,347,858 10/1967 Szarvasi et al.
3,334,096 8/1967 Szarvasi et al. ____ 260—247.2

HENRY R. JILES Primary Examiner

G. THOMAS TODD, Assistant Examiner

U.S. Cl. X.R.

260—347.5, 999

PO-1050
(5/69)

UNITED STATES PATENT OFFICE
CERTIFICATE OF CORRECTION

Patent No. 3,458,529        Dated July 29, 1969

Inventor(s) ETIENNE SZARVASI ET AL

It is certified that error appears in the above-identified patent and that said Letters Patent are hereby corrected as shown below:

Column 1, line 50, change

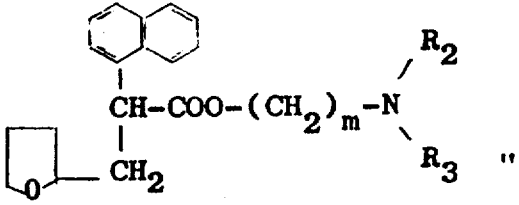

"

to read --

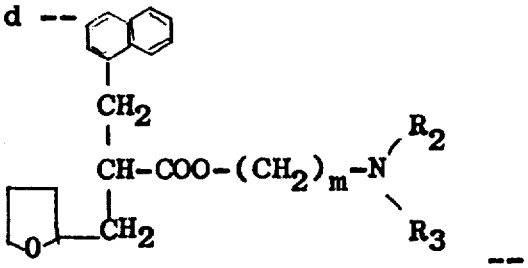

--

Corresponds to typewritten specification, page 2, line 11, as amended by Amendment "B"

dated October 30, 1968.

SIGNED AND
SEALED
APR 14 1970

(SEAL)
Attest:

Edward M. Fletcher, Jr.
Attesting Officer

WILLIAM E. SCHUYLER, JR.
Commissioner of Patents